(12) United States Patent
Matsumoto et al.

(10) Patent No.: US 7,401,929 B2
(45) Date of Patent: Jul. 22, 2008

(54) PROJECTOR AND IMAGE CORRECTION METHOD

(75) Inventors: Morio Matsumoto, Matsumoto (JP); Shiki Furui, Matsumoto (JP); Masaru Kono, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 198 days.

(21) Appl. No.: 11/114,114

(22) Filed: Apr. 26, 2005

(65) Prior Publication Data

US 2005/0280780 A1  Dec. 22, 2005

(30) Foreign Application Priority Data

Jun. 16, 2004  (JP)  ............... 2004-178112

(51) Int. Cl.
G03B 21/00 (2006.01)
G03B 21/14 (2006.01)
H04N 3/22 (2006.01)

(52) U.S. Cl. .................. 353/70; 353/101; 348/745
(58) Field of Classification Search .......... 353/69, 353/70, 121, 101; 348/745–747
See application file for complete search history.

(56) References Cited

U.S. PATENT DOCUMENTS

| 6,367,933 B1 * | 4/2002 | Chen et al. ............. 353/69 |
|---|---|---|
| 6,520,647 B2 * | 2/2003 | Raskar ................... 353/70 |
| 6,592,228 B1 * | 7/2003 | Kawashima et al. ........ 353/101 |
| 7,144,115 B2 * | 12/2006 | Li ....................... 353/31 |
| 2002/0164083 A1 | 11/2002 | Song et al. ............... 382/275 |
| 2004/0061838 A1 | 4/2004 | Mochizuki et al. ......... 353/69 |
| 2005/0024606 A1 * | 2/2005 | Li et al. ................. 353/121 |
| 2005/0041217 A1 | 2/2005 | Tajima ................... 353/69 |
| 2006/0038962 A1 * | 2/2006 | Matsumoto et al. ........ 353/69 |

FOREIGN PATENT DOCUMENTS

| EP | 1 427 199 A2 | 6/2004 |
|---|---|---|
| JP | A 08-292496 | 11/1996 |
| JP | A 2000-241874 | 9/2000 |
| WO | WO 01/47259 A1 | 6/2001 |
| WO | WO 02/101443 A2 | 12/2002 |

* cited by examiner

*Primary Examiner*—Andrew T Sever
(74) *Attorney, Agent, or Firm*—Oliff & Berridge, PLC

(57) ABSTRACT

A projector displays an image on a projection surface. The projector has a zoom adjusting module and a keystone correcting module. The zoom adjusting module adjusts zoom level of a zoom lens for enlarged projection of image light. The keystone correcting module corrects trapezoidal distortion of the image displayed on the projection surface by means of forming the effective panel image in a revised image formation area, the revised image formation area being part of the image formation area of the panel surface.

9 Claims, 7 Drawing Sheets

IMAGE ON LIQUID CRYSTAL PANEL (BEFORE CORRECTION)

IMAGE ON SCREEN (BEFORE CORRECTION)

IMAGE CAPTURED WITH CAMERA (BEFORE CORRECTION)

⇩ PROJECTIVE TRANSFORMATION φ

IMAGE ON LIQUID CRYSTAL PANEL (AFTER CORRECTION)

IMAGE ON SCREEN (AFTER CORRECTION)

IMAGE CAPTURED WITH CAMERA (AFTER CORRECTION)

PROJECTOR AND IMAGE CORRECTION METHOD

CROSS REFERENCE TO RELATED APPLICATIONS

The present application claims the priority based on Japanese Patent Application No. 2004-178112 filed on Jun. 16, 2004, the disclosure of which is hereby incorporated herein by reference in its entirety.

BACKGROUND OF THE INVENTION

1. Field of the Invention

The present invention relates to a projector for projecting light onto a screen or other projection surface to display an image, and in particular relates to a technique for executing zoom adjustment and keystone correction.

2. Description of the Related Art

When an image is displayed on a projection surface such a screen using a projector, trapezoidal distortion sometime occurs in the image displayed on the projection surface (hereinafter termed "display image") due to the relative positions of the projector and the projection surface. In such instances, keystone correction is used to correct trapezoidal distortion of the display image.

Keystone correction is carried out by reducing the image to trapezoidal shape and forming the image on the liquid crystal panel of the projector, and thus when there is appreciable trapezoidal distortion of the display image, the image formed on the liquid crystal panel becomes small, resulting in some instances in a drop in image resolution.

In the meanwhile, projectors are equipped with a zoom lens for adjusting the size of the display image on the projection surface. By adjusting the zoom lens (hereinafter referred to as "zoom adjustment"), zoom level can be adjusted between the telephoto end (smaller display image end) and the wide angle end (larger display image end). When a display image is displayed on the projection surface using the projector, it is preferred that a display image is displayed as large as possible on the projection surface.

Various techniques have been disclosed for performing zoom adjustment and keystone correction automatically, while avoiding a drop in resolution. For example, there has been disclosed a technique in JP2000-241874A whereby a test pattern is displayed on the projection surface and captured with a monitor camera, the image so captured being used to carry out zoom adjustment such that the largest possible display image is displayed automatically on the projection surface; and keystone correction is then performed. There has also been disclosed a technique in JP8-292496A whereby a test pattern is displayed on the projection surface, and zoom adjustment is then carried out while determining whether the pattern has reached maximum size within the projection surface.

However, with the prior art mentioned above, since keystone correction is performed after zoom adjustment to display the display image at maximum size on the projection surface, the display image on the projection surface is reduced due to keystone correction, becoming smaller in size. This causes necessity of repeating zoom adjustment.

An additional problem is that conventional zoom adjustment such as that described above is executed repeatedly through process of projecting a test pattern, capturing it with a monitor camera, making a determination, and performing zoom adjustment, until the intended zoom level is determined, making the process very time consuming.

SUMMARY OF THE INVENTION

An object of the present invention is to provide a technique whereby when projecting an image onto a projection surface with a projector, it is possible to carry out zoom adjustment and keystone correction rapidly and automatically, while avoiding drop in resolution.

In one aspect of the present invention, there is provided a projector which displays an image on a projection surface. The projector comprises a light source, an image formation panel, a zoom adjusting module, and a keystone correcting module. The light source emits light. The image formation panel forms in an image formation area of a panel surface an effective panel image for modulating light emitted by the light source into effective image light representing an image. The zoom adjusting module adjusts zoom level of a zoom lens for enlarged projection of image light. The keystone correcting module corrects trapezoidal distortion of the image displayed on the projection surface by means of forming the effective panel image in a revised image formation area, the revised image formation area being part of the image formation area of the panel surface. The zoom adjusting module adjusts the zoom level to a target zoom level in which a total projection area encompasses the projection surface and in which a perimeter of the total projection area contacts the perimeter of the projection surface at one or more contact points, the total projection area being an area onto which is projected image light corresponding to all areas of the image formation area of the panel surface. The keystone correcting module performs correction such that the perimeter of the revised image formation area contacts the perimeter of the image formation area of the panel surface at a point on the perimeter of the image formation area of the panel surface corresponding to the contact point of the perimeter of the total projection area with the perimeter of the projection surface.

With this projector, since keystone correction is carried out in such a way that the perimeter of the revised image formation area contacts the perimeter of the image formation area of the panel surface, a revised image formation area of large size can be set, and drop in resolution of the effective panel image can be avoided. Additionally, since zoom adjustment is carried out in such a way that the total projection area includes the projection surface, a larger display image can be displayed on the projection surface, and keystone correction to correct trapezoidal distortion can be carried out.

The present invention can be realized in a various aspects. For example, the present invention can be realized in aspects such as a projector, an image projection method and device, an image correction method and device, a zoom adjustment method and device, a keystone correction method and device, a computer program for effecting the functions of such methods or devices, a recording medium for recording such a computer program, and data signals in which such a computer program is carried on the carrier wave.

These and other objects, features, aspects, and advantages of the present invention will become more apparent from the following detailed description of the preferred embodiments with the accompanying drawings.

DESCRIPTION OF THE PREFERRED EMBODIMENT

Next, aspects of the present invention will be described in the following order on the basis of embodiments:

A. Embodiment 1

A-1. Structure of Projector

A-2. Zoom Adjustment/Keystone Correction Process

B. Variations

A. Embodiment 1

A-1. Structure of Projector

Figure 1:
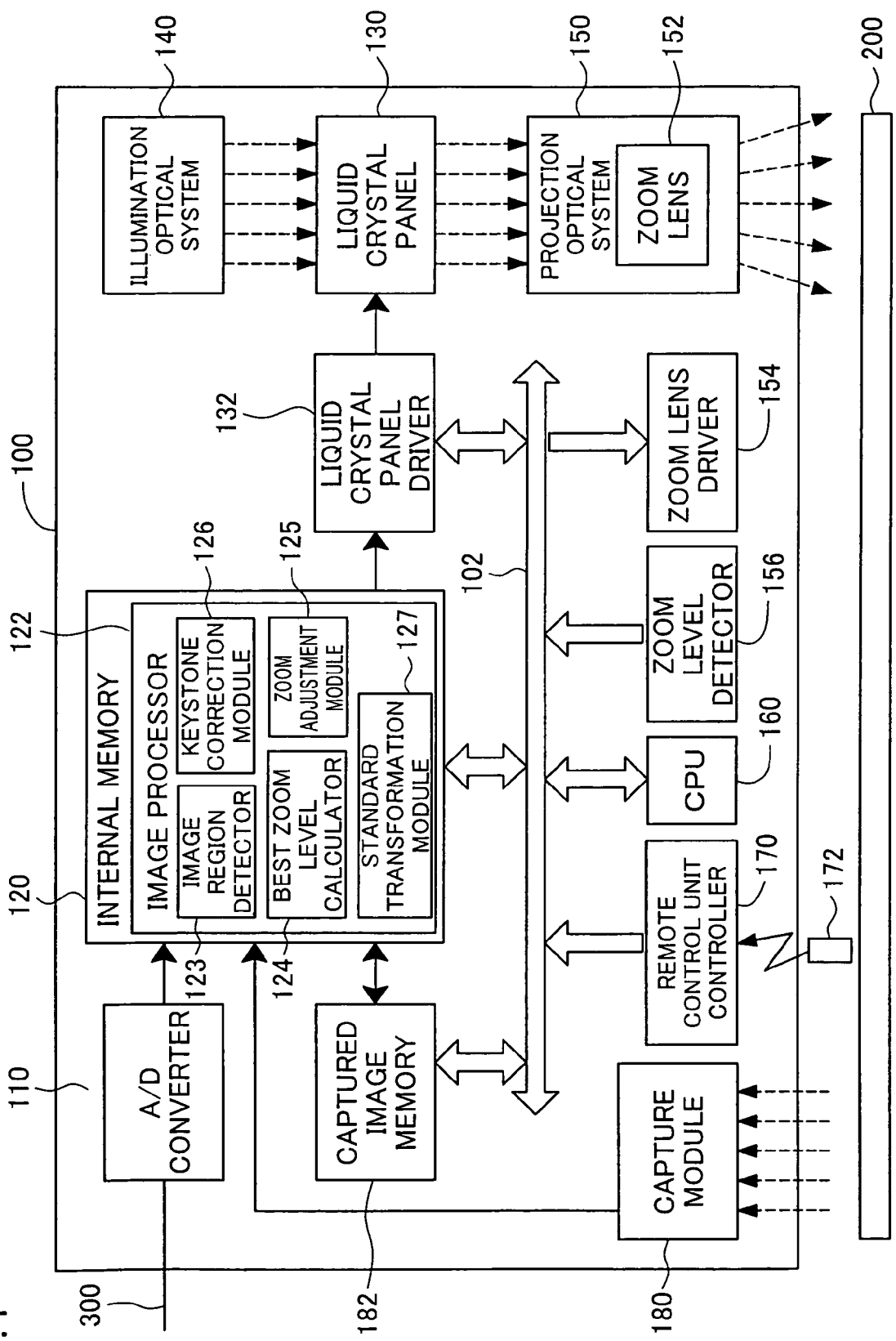
FIG. 1 is a block diagram showing the structure of a projector as embodiment 1 of the present invention.

FIG. 1 is a block diagram showing the structure of a projector as embodiment 1 of the present invention. This projector 100 projects image light representing an image onto a screen 200 or other projection surface to display an image (display image). The projector 100 comprises an A/D converter 110, internal memory 120, a liquid crystal panel 130, a liquid crystal panel driver 132, an illumination optical system 140, a projection optical system 150 that includes a zoom lens 152, a zoom lens driver 154, a zoom level detector 156, a CPU 160, a remote control unit controller 170, a remote control unit 172, a capture module 180, and a captured image memory 182.

The internal memory 120, liquid crystal panel driver 132, zoom lens driver 154, zoom level detector 156, CPU 160, remote control unit controller 170, and captured image memory 182 are interconnected through a bus 102.

The A/D converter 110 performs A/D conversion of an input image signal input from a DVD player or PC (not shown) via a cable 300, to convert it to a digital image signal.

In the internal memory 120 is stored a computer program that functions as an image processor 122. The image processor 122 performs adjustment of image display parameters (e.g. luminance, contrast, sync, tracking, color density, tint etc.) on the digital image signal output by the A/D converter 110, and outputs the resultant signal to the liquid crystal panel driver 132.

The image processor 122 also includes the functions of an image region detector 123, a best zoom level calculator 124, a zoom adjustment module 125, a keystone correction module 126, and a standard transformation module 127; the zoom adjustment/keystone correction process described later is carried out by means of these functions.

Figure 2A:
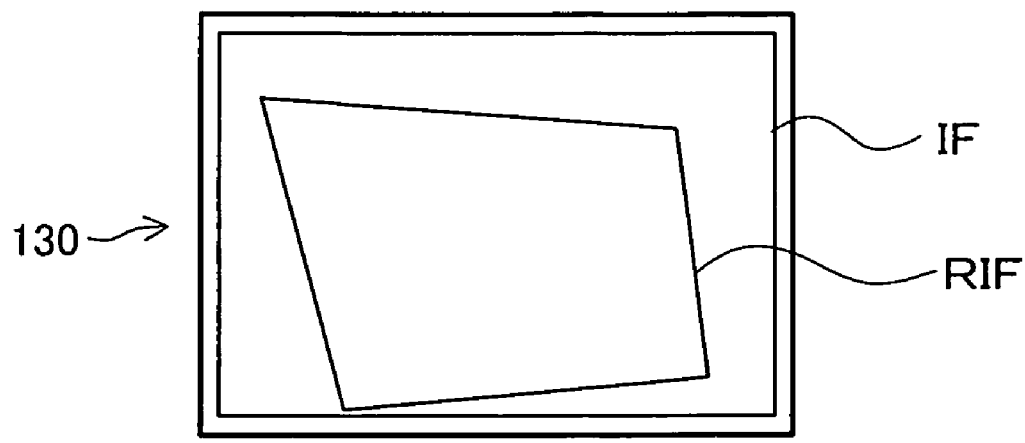
FIGS. 2(a) and 2(b) are diagrams showing the relationship of the liquid crystal panel 130 and the image formation area IF.
Figure 2B:
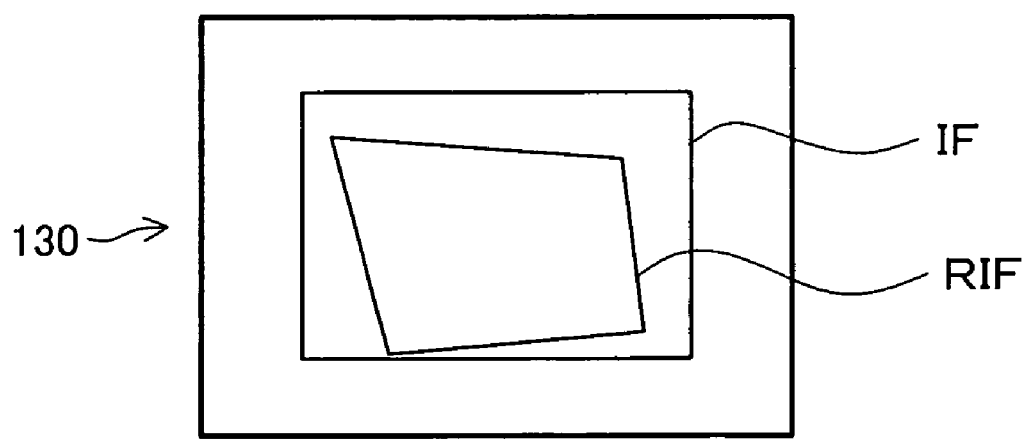

The liquid crystal panel driver 132 drives the liquid crystal panel 130 based on the digital image signal input from the image processor 122. On an image formation area IF of the surface (panel surface) of the liquid crystal panel 130, the liquid crystal panel 130 forms a panel image for the purpose of modulating illumination emitted by illumination optical system 140 into image light representing an image. FIGS. 2(a) and 2(b) are diagrams showing the relationship of the liquid crystal panel 130 and the image formation area IF. The image formation area IF refers to the area on the panel surface of the liquid crystal panel 130 where the digital image signal input to the liquid crystal panel driver 132 can be displayed. As shown in FIG. 2(a), the image formation area IF of this embodiment is established in an area smaller by about 2 dots on all four sides than the total panel surface of the liquid crystal panel 130. The size of the image formation area IF with respect to the total panel surface of the liquid crystal panel 130 may be established arbitrarily. During keystone correction described in detail later, the image to be projected may be formed in an area which is part of the image formation area IF of the liquid crystal panel 130, with a wholly black image formed in other areas. The area of this portion of the image formation area IF is termed the "revised image formation area RIF." The image for display formed in the revised image formation area RIF is termed the "effective panel image."

In the event that, for example, the resolution of the input digital image signal is lower than the resolution of the liquid crystal panel 130, with the input digital image being displayed as is without enlargement, the image formation area IF will be established in an area smaller than the total surface of the liquid crystal panel 130, in association with the ratio of the two resolutions, as shown in FIG. 2(b).

The projection optical system 150 (FIG. 1) is mounted on the front of the projector 100 housing, and functions to enlarge and project light that has been modulated into image light by the liquid crystal panel 130. The zoom lens driver 154 drives the zoom lens 152 provided in the projection optical system 150, to change the zoom level. Here, zoom level refers to the extent (magnification) of enlargement in the projection optical system 150 when projecting light that has passed through the liquid crystal panel 130. That is, the zoom lens driver 154 varies the size of the display image displayed on the screen 200.

The zoom level detector 156 detects the zoom level of the zoom lens 152. Specifically, the zoom level detector 156 includes a variable resistance whose resistance value varies in association with adjustment of the zoom lens 152 and an A/D converter that converts resistance values of the variable resistance to digital values. The zoom level detector 156 detects zoom level based on resistance values in digital value form (hereinafter termed "zoom encoder values"). In this embodiment, zoom level is represented by a zoom level value. Zoom level value is established assigning a baseline value of 1 to the value of the zoom level at which the display image is at its smallest size (hereinafter termed "baseline zoom level"). Zoom level value of any zoom level is represented as the ratio of magnification of the display image in the zoom level to that in the baseline zoom level. The relationship between zoom encoder value and zoom level value is measured in advance and stored in a predetermined area of the internal memory 120.

The remote control unit controller 170 receives commands from a user via the remote control unit 172 and relays the commands to the CPU 160 via the bus 102. In this embodiment, the projector 100 is designed to receive user commands through the remote control unit 172 and remote control unit controller 170, but it would be possible instead to have another arrangement for receiving user commands, such as a control panel for example.

The CPU 160, by reading the computer program that functions as the image processor 122 from the internal memory 120 and executing the program, projects an image onto the screen 200 and performs image processing such as the zoom adjustment/keystone correction process described later. The CPU 160 also controls operation of the various parts of the projector 100.

A-2. Zoom Adjustment/Keystone Correction Process

The projector 100 performs a zoom adjustment/keystone correction process to carry out zoom adjustment and keystone correction automatically. Zoom adjustment is a process for carrying out adjustment of zoom level so that the projected image is displayed as large as possible without running off the edges of the screen 200. Keystone correction is a process for correcting trapezoidal distortion of the display image on the screen 200. The zoom adjustment/keystone correction process begins to execute when user command is made through the remote control unit 172. The zoom adjustment/keystone correction process may begin to execute automatically, for example, when the power is turned on, or when an image signal is input.

Figure 3:
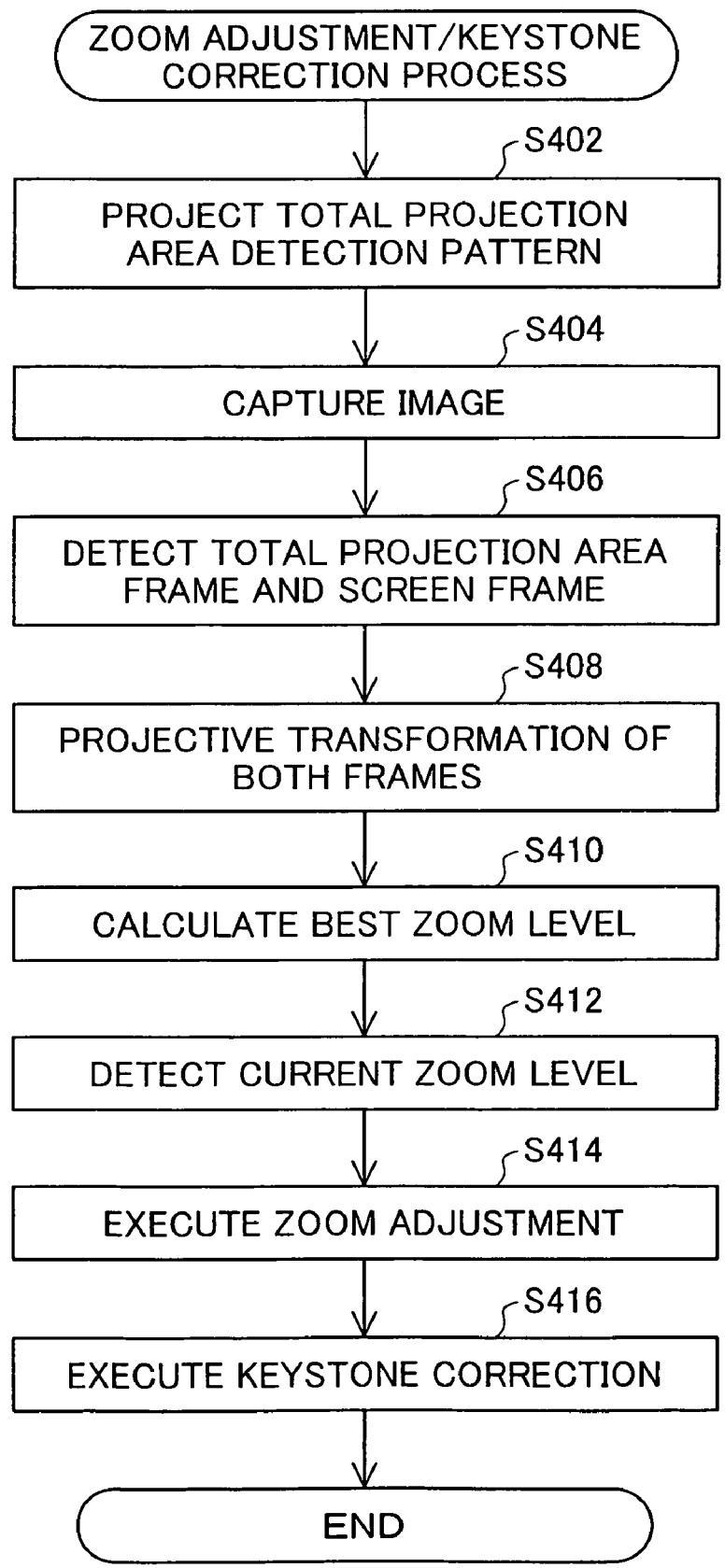
FIG. 3 is a flowchart showing the flow of the zoom adjustment/keystone correction process.

FIG. 3 is a flowchart showing the flow of the zoom adjustment/keystone correction process. In Step S402, the image processor 122 (FIG. 1) projects a total projection area detection pattern. Total projection area refers to an area on the screen 200 or on the wall behind the screen 200 onto which is projected image light corresponding to all areas in the image formation area IF (FIG. 2(a)) of the liquid crystal panel 130. Image light corresponding to all areas in the image formation area IF of the liquid crystal panel 130 refers to the image light projected when the effective panel image is formed in all areas of the image formation area IF of the liquid crystal panel 130.

Figure 4A:
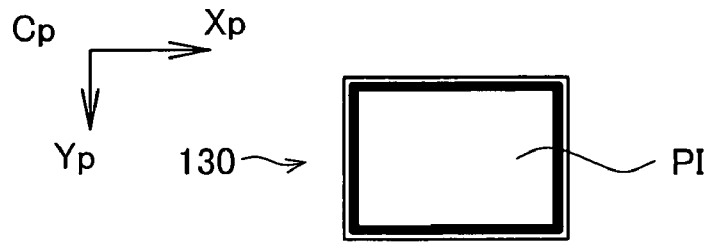
FIGS. 4(a) to 4(c) are diagrams showing an example of projection conditions during projection of a total projection area detection pattern.
Figure 4B:
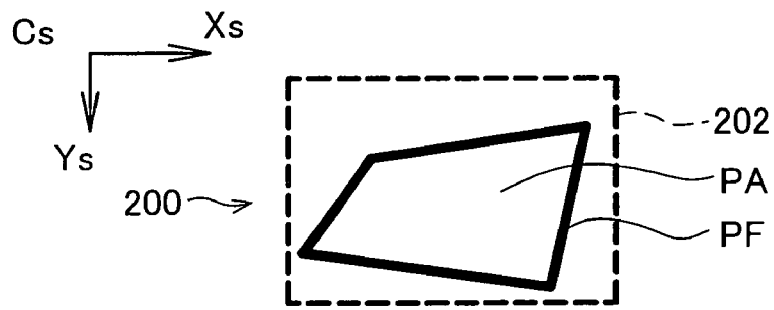
Figure 4C:
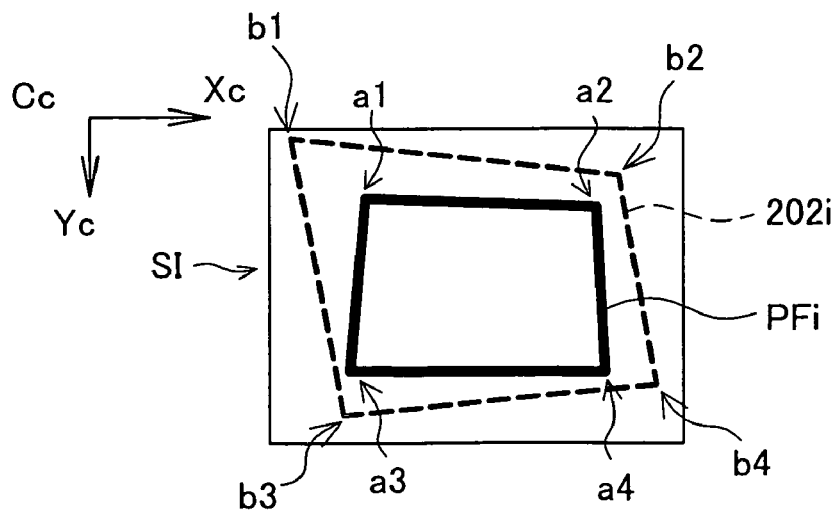

FIGS. 4(a) to 4(c) are diagrams showing an example of projection conditions during projection of a total projection area detection pattern. The condition of the liquid crystal panel 130 is shown in FIG. 4(a). In this embodiment, an entirely white pattern is used as the total projection area detection pattern. Consequently, a panel image (effective panel image) of the white pattern is formed over all areas of the image formation area IF of the liquid crystal panel 130. The effective panel image formed in the image formation area IF is represented as effective panel image PI. The heavy lines in FIG. 4(a) are shown for convenience to represent the boundaries (perimeter) of the entirely white pattern image, and are not part of the actual effective panel image PI.

The condition of the screen 200 is shown in FIG. 4(b). In the example of FIG. 4(b), the entirely white pattern is projected onto an area on the screen 200 bounded by the heavy lines. Since this area is an area on the screen 200 onto which is projected image light corresponding to all areas in the image formation area IF of the liquid crystal panel 130, this area constitutes the total projection area (hereinafter "total projection area PA"). On the screen 200, an entirely white image is displayed within the total projection area PA, with no image light being projected in areas except for the total projection area PA. The heavy lines in FIG. 4(b) are not actually present in the projected image, but are shown for convenience to represent the perimeter of the total projection area PA; this perimeter is termed the "total projection area frame PF." In this embodiment, the screen 200 has a black screen frame 202 along its perimeter. In order to easily distinguish between the screen frame 202 and the total projection area frame PF, in FIGS. 4(a) to 7(e), the screen frame 202 (and screen frame 202i described later) are represented by broken lines.

In the example of FIG. 4(b), the zoom level is such that the total projection area PA is too small relative to the size of the screen 200. As will be apparent from trapezoidal distortion of the total projection area frame PF, trapezoidal distortion has occurred.

The image signal of the total projection area detection pattern is stored in a predetermined area of the internal memory 120. The total projection area detection pattern may be any pattern that enables detection of the total projection area PA.

In Step S404 (FIG. 3), the capture module 180 (FIG. 1) captures the total projection area PA and the screen 200, and creates a shooting image SI taken of the total projection area PA and the screen 200. The capture module 180 has a CCD camera for creating the shooting image SI. The shooting image SI created by the capture module 180 is placed in the internal memory 120 (FIG. 1) from which it is stored in a shooting image memory 182 (FIG. 1). Of course, some other capture device could be used instead of a CCD camera.

The condition of the shooting image SI is shown in FIG. 4(c). The total projection area frame PF (which represents the perimeter of total projection area PA) and the screen frame 202 of the screen 200 are captured in the shooting image SI. In the following description, the total projection area frame on the image is denoted as PFi, and the screen frame on the image as 202i. The total projection area frame PFi on the shooting image SI is substantially rectangular. The screen frame 202i, on the other hand, has trapezoidal distortion. This is because the optical axis of the lens of the CCD camera of the capture module 180 is set substantially parallel to the optical axis of the projection optical system 150. In the example of FIG. 4(c), the optical axis of the CCD camera lens and the optical axis of the projection optical system 150 are not set strictly parallel, and the total projection area frame PFi has slight trapezoidal distortion.

In FIGS. 4(a) to 4(c), there are shown coordinate systems established for the liquid crystal panel 130, the screen 200, and the capture module 180, respectively; these are denoted respectively as the liquid crystal panel coordinate system Cp, the screen coordinate system Cs, and the capture module coordinate system Cc. The liquid crystal panel coordinate system Cp is a coordinate system on a plane parallel to the panel surface of the liquid crystal panel 130 having the image formation area IF. The screen coordinate system Cs is a coordinate system on a plane parallel to the screen 200. The capture module coordinate system Cc is a coordinate system on a plane perpendicular to the optical axis of the CCD camera lens of the capture module 180.

In Step S406 (FIG. 3), the image region detector 123 (FIG. 1) analyzes the image data of the shooting image SI stored in the shooting image memory 182 and detects the total projection area frame PFi and screen frame 202i. Detection of the total projection area frame PFi and screen frame 202i is carried out by means of measuring the contrast ratio of the shooting image SI and extracting pixels with large contrast ratio.

Specifically, the total projection area frame PFi and screen frame 202i are detected in the pixels making up the shooting image SI as locations (coordinates) of pixels in the capture module coordinate system Cc. In this embodiment, the coordinates of the four vertices of the total projection area frame PFi and the screen frame 202i respectively are determined. That is, the coordinates of vertices a1-a4 and vertices b1-b4 shown in FIG. 4(c) are determined.

Figure 5A:
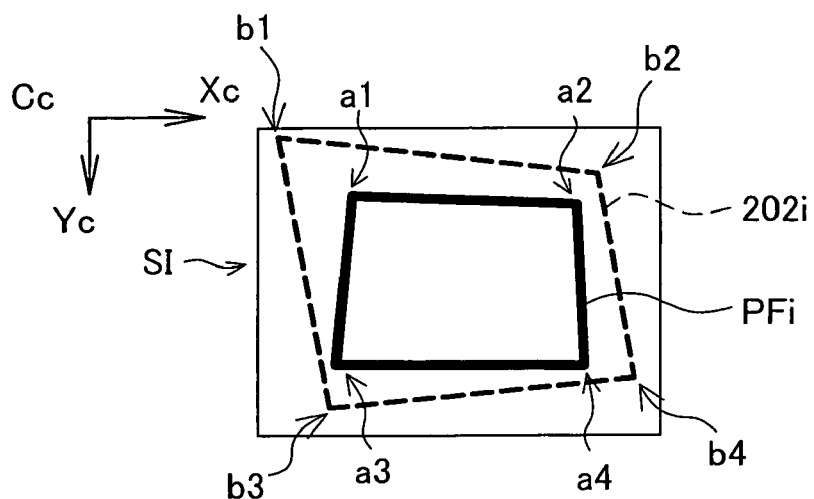
FIGS. 5(a) and 5(b) are diagrams showing conception of projective transformation of the total projection area frame PFi and the screen frame 202i.
Figure 5B:
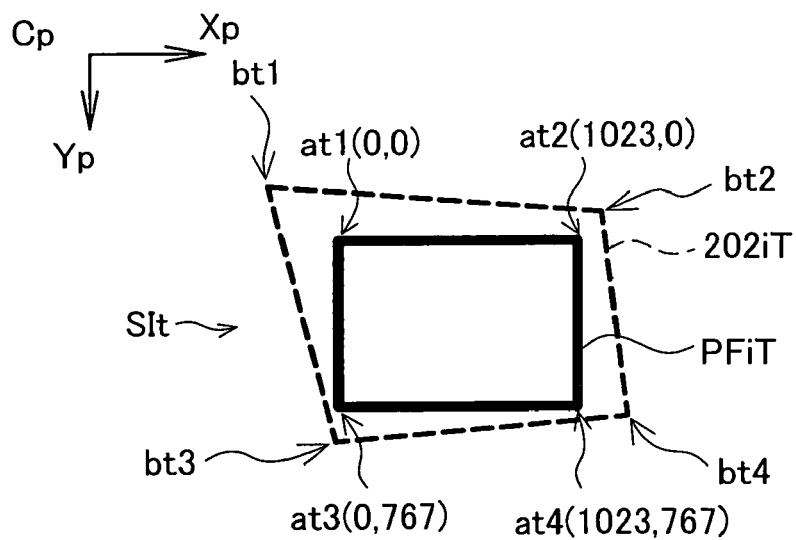

In Step S408 (FIG. 3), the standard transformation module 127 performs projective transformation of the total projection area frame PFi and the screen frame 202i. FIGS. 5(a) and 5(b) are diagrams showing conception of projective transformation of the total projection area frame PFi and the screen frame 202*i*. The shooting image SI is shown in FIG. 5(*a*), while the image after projective transformation (transformed image SIt) is shown in FIG. 5(*b*). Here, projective transformation refers to transformation of coordinates representing the total projection area frame PFi and the screen frame 202*i* in the capture module coordinate system Cc into coordinates on a standard coordinate system. This projective transformation is done in order to compensate for misalignment of the optical axis of the capture module 180 CCD camera lens and the optical axis of the projection optical system 150. In this embodiment, the liquid crystal panel coordinate system Cp is used as the standard coordinate system.

Where the projective transformation is designated as $\phi$, when coordinates (x, y) are transformed in coordinates (u, v) by means of projective transformation $\phi$, the coordinates (u, v) derived by projective transformation are represented by the following equations.

$$u=(ax+by+c)/(gx+hy+1)$$

$$v=(dx+ey+f)/(gx+hy+1)$$

where a, b, c, d, e, f, g, and h are constants.

First, a projective transformation $\phi$ that transforms the coordinates of the four vertices a1-a4 of the total projection area frame PFi in the capture module coordinate system Cc to coordinates in the liquid crystal panel coordinate system Cp is calculated. This projective transformation is specified uniquely. Here, in this embodiment, as shown in FIG. 5(*b*), coordinates of the four vertices at1-at4 of the total projection area frame PFiT after the projective transformation in the liquid crystal panel coordinate system Cp are established respectively at at1 (0, 0), at2 (1023, 0), at3 (0, 767), and at4 (1023, 767). The coordinates are established as above for the purpose of convenience in calculation, by providing correspondence with the resolution of the liquid crystal panel 130 used in this embodiment. The coordinates of the four vertices of the total projection area frame PFiT after projective transformation need not necessarily correspond to liquid crystal panel 130 resolution.

Next, using the derived projective transformation $\phi$, the coordinates of the four vertices b1-b4 of the screen frame 202*i* in the capture module coordinate system Cc are transformed into coordinates in the liquid crystal panel coordinate system Cp, to derive a projective-transformed screen frame 202*i*T. The four vertices of the projective-transformed screen frame 202*i*T are represented by bt1-bt4 as shown in FIG. 5(*b*). In this way, the relative relationship of the total projection area frame PFiT and screen frame 202*i*T in the liquid crystal panel coordinate system Cp are calculated.

In the following description, the projective-transformed total projection area frame PFiT is simply termed total projection area frame PFiT, and the projective-transformed screen frame 202*i*T is simply termed screen frame 202*i*T. The process starting with Step S408 is merely one of calculation using coordinates; there is no need to create an image after transformation. Thus, in FIG. 5(*b*) and following drawings, lines showing actual image borders are not represented.

In Step S410 (FIG. 3), the best zoom level calculator 124 (FIG. 1) calculates a best zoom level. Here, best zoom level refers to the zoom level at which, when carrying out keystone correction while avoiding a drop in resolution of the effective panel image PI formed on the panel surface of the liquid crystal panel 130, the image on the screen 200 can be displayed as large as possible. Best zoom level is discussed further below.

FIGS. 6(*a*) to 6(*c*) are diagrams showing an example of projection conditions after the zoom adjustment/keystone correction process. That is, the zoom adjustment/keystone correction process is executed so as to produce the condition shown in FIGS. 6(*a*) to 6(*c*). FIGS. 6(*a*) to 6(*c*) correspond to FIGS. 4(*a*) to 4(*c*). Specifically, FIG. 6(*a*) represents the condition of the liquid crystal panel 130, and FIG. 6(*b*) the condition of the screen 200. For reference, FIG. 6(*c*) represents the shooting image SI where the projection condition after the zoom adjustment/keystone correction process has been captured by the capture module 180.

As shown in FIG. 6(*b*), the best zoom level is the zoom level at which the total projection area PA encompasses the screen 200, and the perimeter of the total projection area PA contacts the perimeter of the screen 200 (the screen frame 202). The reason for this is as follows.

As shown in FIG. 6(*b*), keystone correction in this embodiment is intended to perform correction of an image so that the image is projected exclusively onto a revised projection area RA that is a part area of the total projection area PA falling within on the screen 200. Thus, as shown in FIG. 6(*a*), the effective panel image PI is formed exclusively within an area (represented as the revised image formation area RIF) inside the image formation area IF on the panel surface of the liquid crystal panel 130, which area corresponds to the revised projection area RA. In areas excluding the revised image formation area RIF in the image formation area IF, a wholly black image is formed so that illuminating light emitted by the illumination optical system 140 is not transmitted.

Since the revised projection area RA is an area that is part of the total projection area PA, if the total projection area PA does not encompass the screen 200, i.e. if zoom level is lower than the level shown in FIG. 6(*b*), there will be an area of non-projection of image light on the screen 200. Thus, the image on the screen will be smaller. Accordingly, if the total projection area PA does not encompass the screen 200, zoom level is not at the best level.

In order to avoid lower resolution of the effective panel image PI, it is preferable to make the revised image formation area RIF as large as possible. The proportion of the total projection area PA occupied by the revised projection area RA is at its greatest when, with the total projection area PA encompassing the screen 200, the perimeter of the total projection area PA is in contact with the screen frame 202. Accordingly, at this time the revised image formation area RIF will be at its largest, and the zoom level at this time will the best zoom level.

FIGS. 7(*a*) to 7(*e*) are diagrams showing conception of calculation of best zoom level. Based on the concept outlined above, calculation of best zoom level is carried out using the total projection area frame PFiT and screen frame 202*i*T in the liquid crystal panel coordinate system Cp calculated in Step S408 (FIG. 3). Specifically, it is carried out by enlarging or reducing the total projection area frame PFiT centered on a predetermined zoom center ZC, deriving a best zoom-adjusted total projection area frame PFiZb; and calculating the factor of the enlargement or reduction (hereinafter best factor Mb). Here, the best zoom-adjusted total projection area frame PFiZb refers to a zoom-adjusted total projection area frame PFiZ derived by enlargement or reduction of the total projection area frame PFiT centered on the zoom center ZC, which frame encompasses the screen frame 202*i*T and contacts the screen frame 202*i*T. The best zoom-adjusted total projection area frame PFiZb can be derived by deriving four zoom-adjusted total projection area frames PFiZ respectively contacting the four vertices of the screen frame 202*i*T, and selecting the best one of the four that has the zoom level furthest towards the wide end.

Figure 7A:
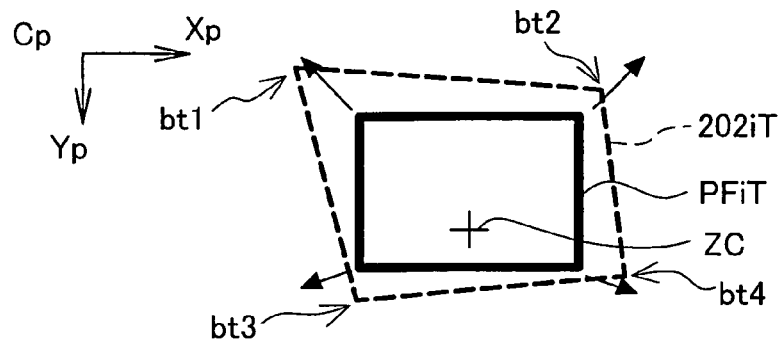
FIGS. 7(a) to 7(e) are diagrams showing conception of calculation of best zoom level.
Figure 7B:
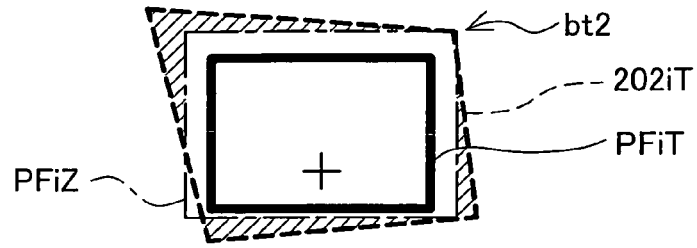
Figure 7C:
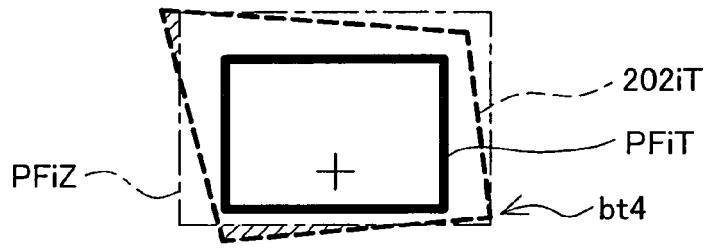
Figure 7D:
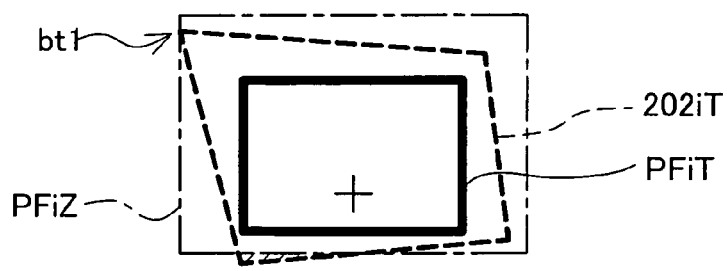

In FIG. 7(a) are shown the total projection area frame PFiT, the screen frame 202iT, and the zoom center ZC in the liquid crystal panel coordinate system Cp. The zoom center ZC is determined based on the relationship of the liquid crystal panel 130 and the zoom lens 152 of the projection optical system 150, and is not necessarily coincide with the center of the image formation area IF of the liquid crystal panel 130. The location of the zoom center ZC is stored in advance in a predetermined area of the internal memory 120, in the form of coordinates in the liquid crystal panel coordinate system Cp. The best zoom level calculator 124 reads out the coordinates for the zoom center ZC that have been stored in the internal memory 120. Coordinates for the zoom center ZC in the liquid crystal panel coordinate system Cp may be established by making measurements on a per-product basis. By so doing, individual differences among products can be corrected, and processing can be carried out accurately.

Figure 7E:
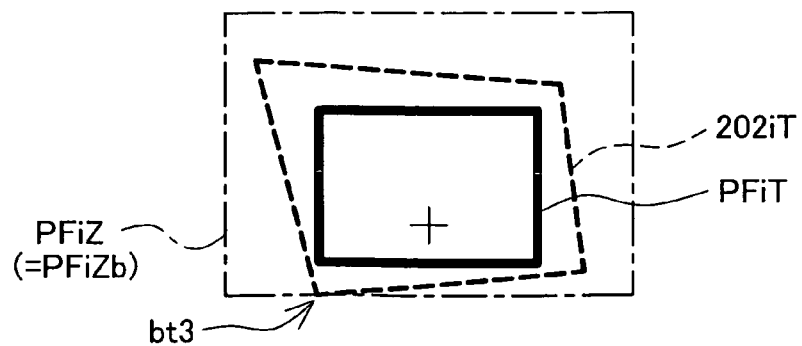

FIGS. 7(b) to 7(e) show enlargement of the total projection area frame PFiT, centered on the zoom center ZC. In FIGS. 7(b) to 7(e), four zoom-adjusted total projection area frames PFiZ that contact respectively the four vertices bt1-bt4 of the screen frame 202iT are indicated by dashed lines. Of these four zoom-adjusted total projection area frames PFiZ, the zoom-adjusted total projection area frame PFiZ that contacts vertex bt3 shown in FIG. 7(e) is that having the zoom level furthest towards the wide-angle end. Accordingly, this is the best zoom-adjusted total projection area frame PFiZb. The other zoom-adjusted total projection area frames PFiZ shown in FIGS. 7(b) to 7(d) do not encompass the screen frame 202iT. At these three zoom levels, there are areas on the screen 200 onto which image light is not projected (areas corresponding to the hatched areas in the drawing), so these do not represent the best zoom level.

If the zoom level were pushed further to the wide-angle end beyond the best zoom-adjusted total projection area frame PFiZb shown in FIG. 7(e), the zoom-adjusted total projection area frame PFiZ and the screen frame 202iT would no longer be in contact, and as such would not represent the best zoom level.

Once the best zoom-adjusted total projection area frame PFiZb has been derived, the enlargement factor to the total projection area frame PFiT (best factor Mb) is calculated.

In Step S412 (FIG. 3), the zoom level detector 156 (FIG. 1) detects the current zoom level. Detection of zoom level is carried out by detecting the zoom encoder value described previously, and calculating a zoom level value based on the zoom encoder value. The current zoom level value so calculated is designated as Zp.

In Step S414 (FIG. 3), the zoom adjustment module 125 (FIG. 1) executes zoom adjustment. Zoom adjustment is carried out by making the zoom level value the value corresponding to the best zoom level (hereinafter termed "best zoom level value"). The best zoom level value is calculated by multiplying the best factor Mb calculated in Step S410 by the current zoom level value Zp calculated in Step S412. That is, the best zoom level value is calculated with the following equation.

Best zoom level value=(Current zoom level value Zp)×(Best factor Mb)

The zoom adjustment module 125 controls the zoom lens driver 154 to perform zoom adjustment so that the zoom level value equals the best zoom level value. This can be carried out through location monitoring by means of polling using the zoom encoder value described previously.

In Step S416 (FIG. 3), the keystone correction module 126 (FIG. 1) executes keystone correction. As described previously with reference to FIG. 6(a), keystone correction in this embodiment is carried out by forming the effective panel image PI exclusively in the revised image formation area RIF in the image formation area IF of the liquid crystal panel 130 corresponding to the revised projection area RA on the screen, in order for the image to be projected exclusively into the revised projection area RA that is a part area of the total projection area PA falling within the screen 200.

Figure 6A:
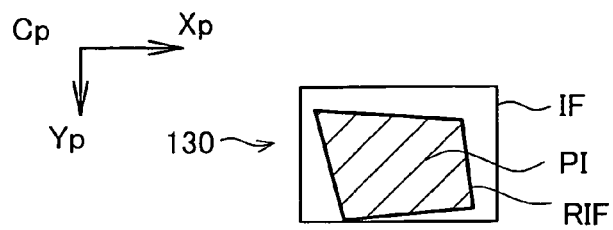
FIGS. 6(a) to 6(c) are diagrams showing an example of projection conditions after the zoom adjustment/keystone correction process.
Figure 6B:
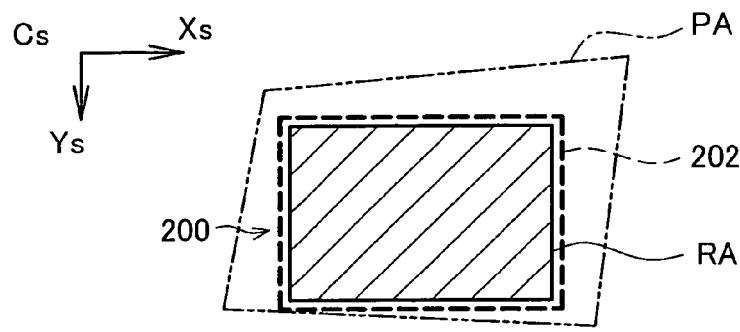

The following description with regard to this point makes reference to FIG. 7(e) and FIG. 6(b). The area bounded by the best zoom-adjusted total projection area frame PFiZb shown in FIG. 7(e) corresponds to the total projection area PA at the best zoom level shown in FIG. 6(b). The area bounded by the screen frame 202iT in FIG. 7(e) corresponds to the revised projection area RA of FIG. 6(b). Accordingly, where the shape of the image in the area bounded by the best zoom-adjusted total projection area frame PFiZb is corrected to the shape of the area bounded by the screen frame 202iT, the image will be displayed fitting within the screen frame 202 of the screen 200.

Since FIG. 7(e) represents the condition in the liquid crystal panel coordinate system Cp, if the area bounded by the best zoom-adjusted total projection area frame PFiZb is realized on the liquid crystal panel 130, the area bounded by the screen frame 202iT will correspond to the revised image formation area RIF (FIG. 6(a)). Accordingly, keystone correction can be carried out by deriving a transformation that makes the best zoom-adjusted total projection area frame PFiZb conform to the screen frame 202iT, and using the transformation to transform the input signal.

As shown in FIG. 6(a), the revised image formation area RIF in the image formation area IF of the liquid crystal panel 130 (area shown by hatching) corresponds to the area bounded by the screen frame 202iT shown in FIG. 7(e). The perimeter of the revised image formation area RIF contacts the perimeter of the image formation area IF, at a point corresponding to the contact point of the best zoom-adjusted total projection area frame PFiZb with the screen frame 202iT.

Figure 6C:
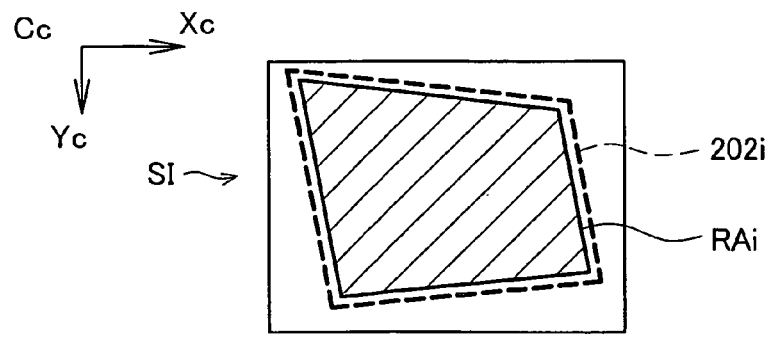

After the zoom adjustment/keystone correction process, the revised projection area RA fits perfectly within the screen frame 202 of the screen 200, as shown in FIG. 6(b). Accordingly, it will be understood that the zoom level is at the best zoom level, and that keystone correction has been carried out. Image light is not projected onto areas other than the revised projection area RA within the total projection area PA. Naturally, as shown in FIG. 6(c), the shooting image SI fits within the screen frame 202 of the screen 200.

As described hereinabove, the projector 100 of this embodiment can carry out a zoom adjustment/keystone correction process. Since the revised image formation area RIF in the image formation area IF on the liquid crystal panel 130 has been established so as to be as large as possible, a drop in resolution of the effective panel image PI can be avoided. Also, since the process of test pattern projection, image capture, determination and zoom adjustment is not executed repeatedly, zoom adjustment and keystone correction can be carried out quickly and automatically. Accordingly, the projector 100 of this embodiment can carry out zoom adjustment and keystone correction quickly and automatically, while avoiding drop in resolution.

B. Variations

The present invention is not limited to the embodiments and aspects described above. The present invention may be worked in various aspects within limits that involve no departure from the spirit of the invention; for example, the following variations are possible.

B1. Variation 1

The projector 100 may additionally comprise a lens shifting module that can shift the zoom lens 152 in the direction perpendicular to the optical axis of the projection optical system 150; and a center location shifting module that shifts the zoom center ZC in accordance with shifting of the zoom lens 152 by the lens shifting module. By means of this arrangement, the projector 100, by means of shifting the zoom lens 152, can shift the total projection area PA in the direction perpendicular to the optical axis of the projection optical system 150. Accordingly, the procedure for positioning the projector 100 can be made easier. Even if the zoom lens 152 has shifted, the zoom center ZC can be shifted in accordance with the shift of the zoom lens 152, whereby an accurate zoom adjustment/keystone correction process is possible. The relationship between shift of the zoom lens 152 and shift of the zoom center ZC can be measured in advance, and stored in a predetermined area of the internal memory 120.

B2. Variation 2

The projector 100 may be constituted so as to calculate the revised image formation area RIF while the zoom adjustment module 125 is controlling the zoom lens driver 154 in order to adjust the zoom lens 152 in the zoom adjustment/keystone correction process. With this arrangement, keystone correction is carried out in parallel with zoom lens 152 adjustment, which is a mechanical operation, whereby the process can be made even faster.

B3. Variation 3

In the embodiment hereinabove, the best zoom level is designated as the zoom level at which the total projection area PA encompasses the screen 200 and the perimeter of the total projection area PA contacts the perimeter of the screen frame 202; however, "contact" herein need not be limited to a state of exact contact, but may include a state of substantial contact. That is, the best zoom-adjusted total projection area frame PFiZb shown in FIG. 7(e) need not be exactly contact with the screen frame 202$i$T, but may instead be separated from it by a distance of about three pixels in the liquid crystal panel 130.

B4. Variation 4

Whereas in the embodiment hereinabove the best zoom level is designated as the zoom level at which the total projection area PA encompasses the screen 200 and the perimeter of the total projection area PA contacts the perimeter of the screen frame 202, such "contact" is not limited to contact at single point, but can include cases of contact along one or several sides.

B5. Variation 5

Whereas in the embodiment hereinabove, projective transformation of the total projection area frame PFi and the screen frame 202$i$ is carried out with the liquid crystal panel coordinate system Cp as the standard coordinate system, projective transformation may instead be carried out with some other coordinate system as the standard coordinate system. Also, it is not always necessary to carry out projective transformation; it is possible to dispense with the process.

B6. Variation 6

Whereas in the embodiment hereinabove, variable resistance is used to detect zoom level, but zoom level could instead be detected by some other method. For example, it would be possible to attach a rotary encoder to the zoom lens 152, and to detect zoom level from the output value of the rotary encoder. Alternatively, it would be possible to use a stepping motor as the zoom lens driver 154, and to detect zoom level from the extent of drive thereof. It would also be possible to capture the total projection area PA with the capture module 180, and detect the zoom level from the size of the total projection area PA in the shooting image SI.

B7. Variation 7

Whereas in the embodiment hereinabove, during zoom adjustment, adjustment of the zoom lens 152 in order to make the zoom level value equal to the best zoom level value is carried out through location monitoring by means of polling using zoom encoder values, it may instead be carried out by some other method. For example, it would be possible to attach a rotary encoder to the zoom lens 152, and to perform zoom adjustment through location monitoring by means of polling using the rotary encoder. Alternatively, it would be possible to use a stepping motor as the zoom lens driver 154, and to carry out zoom adjustment based on the extent of drive thereof. Also, a motor drive time interval may be calculated from drive speed of the zoom lens 152 measured in advance, and zoom adjustment carried out by driving the motor for the specified time interval.

B8. Variation 8

Whereas in the embodiment hereinabove, keystone correction is carried out by means of transformation so as to align the best zoom-adjusted total projection area frame PFiZb with the screen frame 202$i$T, keystone correction may be carried out by some other method instead. For example, it may be carried out using a distance sensor or angle sensor.

B9. Variation 9

Whereas in the embodiment hereinabove, best zoom level is calculated by means of calculations using the screen frame 202$i$T and the total projection area frame PFiT, it would instead be possible to derive best zoom level by actually driving the zoom lens 152 to vary the zoom level, and analyzing the shooting image SI taken by the capture module 180.

B10. Variation 10

Whereas in the embodiment hereinabove, the zoom level value of the baseline zoom level is assigned a baseline value of 1, with the zoom level value of any zoom level being represented in terms of the enlargement factor ratio thereof to the baseline zoom level, zoom level value may be represented by some other method instead. For example, it would be possible to represent zoom level assigning a zoom level value of 0 to the zoom level furthest to the telephoto end and a zoom level value of 255 to the zoom level furthest to the wide angle end.

B11. Variation 11

Whereas in the embodiment hereinabove, only a single liquid crystal panel 130 is shown, it would be possible to provide a plurality of liquid crystal panels 130 for a plurality of color components. An electro-optical device other than a liquid crystal panel (e.g. a DMD) may also be used.

B12. Variation 12

Whereas in the embodiment hereinabove, a screen 200 is used as the projection surface, but it would be possible to use some other surface as the projection surface. For example, where the walls of the room are white, the wall may be used as the projection surface, by drawing a rectangular frame on the wall with black lines created with tape or paint. Alternatively, a rectangular frame may be drawn with black lines on a white board, and the white board used as the projection surface.

The color of the projection surface is not limited to one in which the frame is black and the areas to the inside and outside of the frame are white; a white frame with black areas to the inside and outside of the frame would be possible as well. For example, a rectangular frame may be drawn with chalk on a blackboard, and the blackboard used as the projection surface.

In the present invention, projection surface colors are not limited to white and black, but may consist of any color combination whose colors have a predetermined contrast ratio between the color of the frame the color of the areas to the inside and outside of the frame.

What is claimed is:

1. A projector for displaying an image on a projection surface comprising:
    a light source configured to emit light;
    an image formation panel configured to form an effective panel image for modulating light emitted by the light source into effective image light representing an image, the image formation panel being formed in an image formation area of a panel surface; and
    an image processor including a zoom adjusting module and a keystone correcting module,
    the image processor configured to correct for trapezoidal distortion on the projection surface by (1) adjusting the zoom level of a zoom lens to a target zoom level, and (2) performing a keystone correction;
    the image processor correcting for trapezoidal distortion of the image displayed on the projection surface by means of forming the effective panel image in a revised image formation area, the revised image formation area being part of the image formation area of the panel surface;
    the zoom adjusting module adjusting the zoom level to the target zoom level;
    the target zoom level being a zoom level in which a total projection area encompasses the projection surface, and in which a perimeter of the total projection area contacts the perimeter of the projection surface at one or more contact points, the total projection area being an area onto which is projected image light corresponding to all areas of the image formation area of the panel surface; and
    the keystone correcting module performing a keystone correction such that the perimeter of the revised image formation area contacts the perimeter of the image formation area of the panel surface, the contact between the revised image formation area and the perimeter of the image formation area of the panel surface being at a point on the perimeter of the image formation area of the panel surface corresponding to the contact point of the perimeter of the total projection area with the perimeter of the projection surface.

2. A projector according to claim 1, further comprising:
    a zoom level detecting module configured to detect zoom level;
    an image capture module configured to capture a projection status image including an image of the projection surface and an image of the total projection area;
    an image region detecting module configured to detect within the projection status image a projection surface image region representing the projection surface and an total projection area image region representing the total projection area; and
    a target image region calculating module configured to calculate a target total projection area image region, the target total projection area image region representing the total projection area image region magnified or reduced centered on a predetermined zoom center location such that the target total projection area image region encompasses the projection surface image region, and that a perimeter of the target total projection area image region contacts a perimeter of the projection surface image region, wherein the zoom adjusting module multiplies zoom level detected by the zoom level detecting module, by a magnification ratio or reduction ratio of the target total projection area image region with respect to the total projection area image region, to calculate the target zoom level, and the keystone correcting module calculates the revised image formation area by means of transformation of a perimeter of the image formation area of the panel surface such that the perimeter of the target total projection area image region conforms to the perimeter of the projection surface image region.

3. A projector according to claim 2, further comprising:
    a standard transformation module configured to transform the projection surface image region and the total projection area image region detected by the image region detecting module to a predetermined standard coordinate system, wherein the target image region calculating module calculates the target projection area image region by use of the projection surface image region and the total projection area image region transformed by the standard transformation module.

4. A projector according to claim 3, wherein the standard coordinate system is a coordinate system in a plane parallel to the panel surface having the image formation area.

5. A projector according to claim 2, wherein the zoom center location is a predetermined location other than the center of the image formation area of the panel surface.

6. A projector according to claim 2, further comprising:
    a lens shifting module configured to shift the zoom lens in a direction perpendicular to the optical axis of the zoom lens; and
    a center location shifting module configured to shift the zoom center location depending on shift of the zoom lens by the lens shifting module.

7. A projector according to claim 2, wherein the keystone correcting module performs calculation of the revised image formation area while the zoom adjusting module is adjusting the zoom lens.

8. An image correction method for correcting an image in a projector for displaying an image on a projection surface, the method comprising the steps of
    (a) forming an effective panel image in an image formation area of a panel surface, the effective panel image being an image for modulating light emitted by a light source into effective image light representing an image;
    (b) adjusting zoom level of a zoom lens for enlarged projection of image light; and
    (c) correcting trapezoidal distortion of the image displayed on the projection surface by means of forming the effective panel image in a revised image formation area, the revised image formation area being part of the image formation area of the panel surface,
    wherein the step (b) includes the step of adjusting the zoom level to a target zoom level in which a total projection area encompasses the projection surface and in which a perimeter of the total projection area contacts the perimeter of the projection surface at one or more contact points, the total projection area being an area onto which is projected image light corresponding to all areas of the image formation area of the panel surface, and the step (c) includes the step of performing correction such that the perimeter of the revised image formation area contacts the perimeter of the image formation area of the panel surface at a point on the perimeter of the image formation area of the panel surface corresponding to the contact point of the perimeter of the total projection area with the perimeter of the projection surface.

9. A computer program product for correcting an image in a projector for displaying an image on a projection surface, the projector comprising a light source configured to emit light, and an image formation panel configured to form in an image formation area of a panel surface an effective panel image for modulating light emitted by the light source into effective image light representing an image, the computer program product comprising: a computer readable medium; and a computer program stored on the computer readable medium, the computer program including:

a first program for causing a computer in the projector to adjust zoom level of a zoom lens for enlarged projection of image light; and a second program for causing the computer to correct trapezoidal distortion of the image displayed on the projection surface by means of forming the effective panel image in a revised image formation area, the revised image formation area being part of the image formation area of the panel surface, wherein the first program includes a program for causing the computer to adjust the zoom level to a target zoom level in which a total projection area encompasses the projection surface and in which a perimeter of the total projection area contacts the perimeter of the projection surface at one or more contact points, the total projection area being an area onto which is projected image light corresponding to all areas of the image formation area of the panel surface, and the second program includes a program for causing the computer to perform correction such that the perimeter of the revised image formation area contacts the perimeter of the image formation area of the panel surface at a point on the perimeter of the image formation area of the panel surface corresponding to the contact point of the perimeter of the total projection area with the perimeter of the projection surface.

* * * * *